United States Patent [19]

Obrecht et al.

[11] Patent Number: 6,133,364
[45] Date of Patent: Oct. 17, 2000

[54] RUBBER COMPOSITION, METHOD OF FORMULATING THE COMPOSITION AND VEHICLE TIRE MADE FROM THE COMPOSITION

[75] Inventors: Werner Obrecht, Moers; Thomas Scholl, Bergisch Gladbach; Peter Wendling, Leverkusen; Michael Well, Vechelde, all of Germany; Victor Monroy, Charlotte, N.C.

[73] Assignee: Continental Aktiengesellschaft, Hannover, Germany

[21] Appl. No.: 09/365,225

[22] Filed: Jul. 30, 1999

[30] Foreign Application Priority Data

Aug. 1, 1998 [DE] Germany .......................... 198 34 803

[51] Int. Cl.⁷ ............................... C08J 5/10; C08K 3/04; C08L 7/00
[52] U.S. Cl. ...................... 524/495; 524/496; 525/331.9; 525/382; 525/237; 525/105
[58] Field of Search .................................. 525/331.9, 382, 525/381, 237, 105; 524/526, 495, 496

[56] References Cited

U.S. PATENT DOCUMENTS 4,268,642   5/1981   Gunesin et al. ......................... 525/382

FOREIGN PATENT DOCUMENTS 2226917   7/1998   Canada .
575851   12/1993   European Pat. Off. .
854170   7/1998   European Pat. Off. .

*Primary Examiner*—James J. Seidleck
*Assistant Examiner*—U. K. Rajguru
*Attorney, Agent, or Firm*—Greenblum & Bernstein, P.L.C.

[57] ABSTRACT

A rubber composition, which contains a rubber mixture that can be vulcanized with a vulcanizing agent, which includes at least one rubber component, at least one filler, gel particles comprising a rubber, having a particle size between about $3 \times 10^{-9}$ and about $1 \times 10^{-6}$ m and a swelling index in toluene of about 1 to about 15 and whose surface has electrophilic centers, and a substance which acts as a coupling agent between the gel particles and which has the structure A—R—A, wherein A is a nucleophilic group, and R is a saturated or unsaturated hydrocarbon group. The rubber composition has improved hysteresis behavior in the vulcanized state so that when this rubber composition is used in tires, the rolling resistance is reduced and the wet slippage behavior is improved in relation to the conventional rubber compositions. A method of formulating the rubber composition as well as a composition useful for tire treads and vehicle tires containing the composition are disclosed.

50 Claims, No Drawings

RUBBER COMPOSITION, METHOD OF FORMULATING THE COMPOSITION AND VEHICLE TIRE MADE FROM THE COMPOSITION

CROSS-REFERENCE TO RELATED APPLICATIONS

The present application claims priority under 35 U.S.C. § 119 of German Patent Application No. 198 34 803.7, filed on Aug. 1, 1998, the disclosure of which is expressly incorporated by reference herein in its entirety.

Reference is made to application, Attorney Docket No. P18157, U.S. Application No. 09/365,227, entitled "Rubber Composition, Method of Adding and Blending the Composition and Vehicle Tire Made from the Composition, which is concurrently filed with the present application.

Reference is made to application, Attorney Docket No. P18215, U.S. Application Ser. No. 09/365,226, entitled "Rubber Composition, Method of Formulating and Blending the Same and Article and Tires Made Therefrom", which is concurrently filed with the present application.

BACKGROUND OF THE INVENTION

1. Field of the Invention

The invention relates to a rubber composition which contains at least one rubber component and at least one filler, as well as conventional additives. The composition is particularly useful in tire treads, and the invention relates to tires containing the inventive composition.

2. Discussion of Background Information

Rubber compositions are used for the production of rubber products for a wide variety of uses. Depending on the field of use, different demands are placed on the particular rubber composition. Thus, in addition to rubber components, the rubber composition contains other components, such as fillers, anti-aging agents, and vulcallizing agents, which materially affect the propelties of the finished rubber product. For this reason, suitable systems of polymer and additional constituents must be prepared in order to obtain the appropriate properties of the rubber product. Fillers in a rubber composition are accorded great importance. Not only do they contribute to reducing the cost of rubber compositions, their specific effects on the rubber arc also exploited. For this reason, there has been no lack of experiments, e.g., to mix a wide variety of fillers, in the rubber composition. Thus, carbon black and silicic acid, for example, are known as fillers. It has been observed that rubber products which contain carbon black, for example, as a filler, have a sufficient mechanical load bearing capacity, but when these mixtures are used in tire treads, the tires have the disadvantage arises that they have a high rolling resistance and a poor wet skid behavior. An attempt has been made to solve this problem by adding silicic acid into the tread mixture; this in turn requires a filler activator for binding to the polymer. However, it has been observed that rubber products which contain silicic acid as a filler and a conventional organosilane as a filler activator (e.g., bis-3-(triethoxysilylpropyl)tetrasulfide) have an inadequate influence on the hysteresis behavior and the reinforcement of the rubber product for modern application areas. Thus, current rubber mixtures for the manufacture of vehicle tires (e.g., tire treads) are required that, in the vulcanized state, lend the tire even lower rolling resistance with an additionally improved wet slippage behavior. At the same time, other mechanical properties, such as durability, should be negatively influenced as little as possible.

SUMMARY OF THE INVENTION

Other exemplary embodiments and advantages of the present invention may be ascertained by reviewing the present disclosure.

The present invention provides for the preparation of rubber compositions which demonstrate an improved hysteresis behavior in the vulcanized state so that when these rubber compositions are used, e.g., in tires, the rolling resistance is reduced and the wet slippage behavior is improved in comparison to conventional rubber compositions.

Also the present invention provides for an elastomer or rubber composition that can be better strengthened through the use of an appropriate filler system.

The present invention provides for a rubber composition having a rubber mixture that can be vulcanized with a vulcanizing agent, which includes:

a) at least one rubber component, b) at least one filler, c) as an additional filler, gel particles comprising a rubber, having a particle size between about $3 \times 10^{-9}$ and about $1 \times 10^{-6}$ m and a swelling index in toluene of about 1 to about 15 and whose surface has electrophilic centers, d) a substance acting as a coupling agent between the additional filler having the following structure:

wherein A is a nucleophilic group,

R is a saturated or unsaturated hydrocarbon group having a molecular weight of up to about $10^6$ g/mol or siloxane group having a molecular weight of up to about $10^6$ g/mol.

The present invention also provides for a vehicle tire having a tread formed of a composition which includes a rubber mixture that can be vulcanized with a vulcanizing agent such as sulfur. The composition may include:

a) at least one rubber component, b) at least one filler, c) as an additional filler, gel particles comprising a rubber, having a particle size between about $3 \times 10^{-9}$ and about $1 \times 10^{-6}$ m and a swelling index in toluene of about 1 to about 15 and whose surface has electrophilic centers, d) a substance acting as a coupling agent between the additional filler having the following structure:

wherein A is a nucleophilic group,

R is a saturated or unsaturated hydrocarbon group having a molecular weight of up to about $10^6$ g/mol or siloxane group having a molecular weight of up to about $10^6$ g/mol. A may be selected from one of $-NH_2$, $-SH$, $-Si-OH$, $-OH$, $-NR^1_2$ or $-NHR^1$, wherein $R^1$ may be an alkyl group with up to about 3 carbon atoms or a phenyl group.

The present invention also provides for a pneumatic tire having a tread formed of a composition which includes a rubber mixture that can be vulcanized with a vulcanizing agent such as sulfur. The composition may include:

a) at least one rubber component, b) at least one filler, c) as an additional filler, gel particles comprising a rubber, having a particle size between about $3 \times 10^{-9}$ and about $1 \times 10^{-6}$ m and a swelling index in toluene of about 1 to about 15 and whose surface has electrophilic centers, d) a substance acting as a coupling agent between the additional filler having the following structure:

A—R—A wherein A is a nucleophilic group,
R is a saturated or unsaturated hydrocarbon group having a molecular weight of up to about $10^6$ g/mol or siloxane group having a molecular weight of up to about $10^6$ g/mol. A may be selected from one of —$NH_2$, —SH, —Si—OH, —OH, —$NR^1_2$ or —$NHR^1$, wherein $R^1$ may be an alkyl group with up to about 3 carbon atoms or a phenyl group.

The invention further provides for a method of formulating a rubber composition, which includes:

forming a mixture comprising at least one rubber component and mixing;

adding to the mixture at least one filler and mixing; adding to the mixture as an additional filler, gel particles comprising a rubber, having a particle size between about $3 \times 10^{-9}$ and about $1 \times 10-6$ m and a swelling index in toluene of about 1 to about 15 and whose surface has electrophilic centers, and mixing; and adding to the mixture a substance acting as a coupling agent between the gel particles. The substance acting as the coupling agent may be:

A—R—A wherein A may be a nucleophilic group and is defined above, and R may be a saturated or unsaturated hydrocarbon group having a molecular weight of up to about $10^6$ g/mol or siloxane group having a molecular weight of up to about $10^6$ g/mol.

The present invention further provides for a composition having a rubber mixture that can be vulcanized with a vulcanizing agent which includes:

a) at least one rubber component,
b) at least one filler,
c) as an additional filler, gel particles consisting essentially of a rubber, having a particle size between about $3 \times 10^{-9}$ and about $1 \times 10^{-6}$ m and a swelling index in toluene of about 1 to about 15 and whose surface has electrophilic centers,
d) a substance acting as a coupling agent between the gel particles of the additional filler and having the following structure:

A—R—A wherein A is a nucleophilic group, and R is a saturated or unsaturated hydrocarbon group having a molecular weight of up to about $10^6$ g/mol or siloxane group having a molecular weight of up to about $10^6$ g/mol.

In the foregoing compositions and method, A may be selected from one of —$NH_2$, —SH, —Si—OH, —OH, —$NR^1_2$ or —$NHR^1$, wherein $R^1$ may be an alkyl group with up to about 3 carbon atoms or a phenyl group.

The gel may be a butadiene-styrene rubber modified with p-chloromethyl styrene with a swelling index in toluene between about 1 and about 15 and a particle size between about $3 \times 10^{-9}$ and about $1 \times 10^{-6}$ m. The composition contains about 10 to about 110 phr gel relative to 100 parts of total rubber material.

The substance acting as a couplining agent may in particular be:

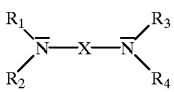

wherein each of $R_1$, $R_2$, $R^3$, and $R_4$ may be the same or different and may be H, or a branched or unbranched alkyl group having up to about 4 C atoms; and X may be a branched, unbranched or cyclic alkyl group having up to about 12 C atoms.

The substance acting as a coupling agent may be one or both of 1,8-diamino octane or 1,4-bis-dimethylaminobutane.

The substance acting as a coupling agent may further be:

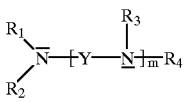

wherein each of $R^1$, $R^2$, $R^3$, and $R_4$ may be the same or different and may be H, or a branched or unbranched alkyl group having up to about 4 C atoms; Y may be a branched, unbranched or cyclic alkyl group having up to about 4 C atoms; and m is an integer from 1 to 6.

The substance acting as a coupling agent may be one or more of pentaethylene hexamine, polybutadiene terminated with OH-groups, polydimethyl siloxane that contains $NH_2$ groups, or a copolymer of butadienc and acrylonitrile terminated with $NH_2$ groups. The copolymer may have a molecular weight of about 3,000 to about 4,500 g/mol and an acrylonitrile content of about 5 to about 30 weight percent.

The rubber component may be selected from natural rubber, synthetic polyisoprene, styrene-butadiene copolymer, polybutadiene or mixtures thereof.

Based on 100 parts by weight of the rubber component, the gel particles having electrophilic centers may be present in a range of from about 10 plir to about 110 phr, and the substance acting as a coupling agent may be present in a range of from about 10 mole % to about 100 mole % with respect to the molar amount of the electrophilic centers of the gel particles. Based on 100 parts by weight of the rubber component, the gel particles having electrophilic centers may preferably be present in a range of from about 25 phr to about 85 phr, and the substance acting as a coupling agent may prefelTably be present in a range of from about 10 mole % to about 50 mole % with respect to the molar amount of the electrophilic centers of the gel particles. Based on 100 parts by weight of the rubber component, the gel particles having electrophilic centers may more preferably be present in a range of from about 40 phr to about 60 phr, and the substance acting as a coupling agent may more preferably be present in a range of from about 15 mole % to about 35 mole % with respect to the molar amount of the electrophilic centers of the gel particles.

A tire and in particular a tread may be formed from any of the above compositions.

A gel particle system may be made by reacting a gel with a coupling agent. After vulcanization, the system results in a rubber product having a wide variety of uses because of its favorable mechanical properties, such as, for example, its tensile modulus. In addition, according to the present invention, vulcanizates can now be produced, which have outstanding damping properties and are particularly suitable for use in tire treads due to the reduction in the rolling resistance and simultaneous improvement of the wet slippage behavior. Using a rubber composition according to the present invention eliminates the use of silicic acid, thus obviating problems which occur with its use in conventional rubber compositions due to the slight electrical conductivity of silicic acid-filled compounds.

In the composition, the gel may comprise a rubber, e.g., at least one rubber component (e.g., NR, BR, SBR, NBR) and if necessary, other additives, such as anti-aging agents.

The composition according to the present invention may contain, based on 100 parts by weight of the rubber component, the gel particles having electrophilic centers in a range of from about 10 phr to about 110 phr, and the substance acting as a coupling agent in a range of from about 10 mole % to about 100 mole % with respect to the molar amount of the electrophilic centers of the gel particles.

It is especially preferred that the composition according to the present invention contain, based on 100 parts by weight of the rubber component, the gel particles having electrophilic centers in a range of from about 25 phr to about 85 phr, and the substance acting as a coupling agent in a range of from about 10 mole % to about 50 mole % with respect to the molar amount of the electrophilic centers of the gel particles.

It is especially most preferred that the composition according to the present invention contain, based on 100 parts by weight of the rubber component, the gel particles having electrophilic centers in a range of from about 40 phr to about 60 phr, and the substance acting as a coupling agent in a range of from about 15 mole % to about 35 mole % with respect to the molar amount of the electrophilic centers of the gel particles.

The rubber composition of this invention may be used to make an article, such as a vehicle tire, a pneumatic tire, a tread, a sidewall, a reinforcement layer, a pneumatic spring, a conveyor belt, or a drive belt.

When the rubber composition of this invention is used to make a tire tread, it may be used to constitute the tread.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

The polymer matrix of the gel used in the rubber composition according to the present invention, on whose surface electrophilic centers are disposed, can be produced, for example, in the following manner:

1. by means of copolymerization of at least two monomers, e.g., polymerization of butadiene with p-chloromethyl styrene;
2. subsequent functionalization of a polymer (e.g., by means of grafting), e.g., styrene-butadiene copolymer being grafted onto the p-chloromethyl styrene;
3. subsequent modification of a polymer (e.g., by means of splitting ester groups), e.g., polymerization of butadiene with methacrylic acid methylester and subsequent hydrolysis.

The production of the gels is carried out in the latex phase of the polymer. As used herein, latex that is at least pre-cross-linked by the addition of an additional cross-linking agent is called a gel. The production of gels is described below.

After a latex containing rubber is produced in accordance with the above steps 1 to 3, the latex may be cross-linked by the addition of a cross-linking agent such as a peroxide. An example of a peroxide is dicumyl peroxide. This may be carried out in an autoclave. Sufficient cross-linking agent is added such that the swelling index of the gel in toluene is adjusted to between about 1 and about 15, preferably between about 1 and about 10. It is also possible to provide the surface of the latex with electrophilic centers. This may occur after the setting of the swelling index during the production of the gel, for example, in accordance with the above-mentioned steps 2 or 3.

Furthermore, it is possible to add further additives, such as anti-aging agents, to the latex phase or to the gel. The gel is removed, filtered off, washed, and dried to constant weight. The gel obtained has a particle size from about 3 to about 1000 nm. This is determined by using the DIN 53 206 ultracentrifugation method. The centrifuge speed is 20,000 rpm. It is also possible to precipitate from a prepared master batch the pre-cross-linked or cross-linked latex (gel) together with non-cross-linked latex so that a separate step to isolate the gel can be eliminated.

The swelling index ($Q_i$) of the gels is calculated from the weight of the solvent containing gel (after centrifugation at 20000 rpm) and the weight of the dry gel:

$Q_i$=wet weight of the gel/dry weight of the gel.

To determine the swelling index, for example, 250 mg of gel are allowed to swell for 24 hours with agitation in 25 ml of toluene. The gel is then centrifuged (at 20,000 rpm) and weighed (wet weight), and subsequently dried at 70° C. to constant weight and weighed again (dry weight).

The surface of the gel may contain groups, such as halogens (preferably chlorine, bromine), $-NH_2$, $-OH$, etc., which produce a positive (electrophilic) center where a nucleophilic attack, i.e., a nucleophilic substitution, by the nucleophilic groups of the specified coupling agents may take place.

It is especially preferred that the gel is styrene butadiene rubber modified with p-chloromethyl styrene with a swelling index in toluene between about 1 and about 15 and a particle size between about $3\times10^{-9}$ and about $1\times10^{-6}$ m.

The improvements in the properties of a rubber composition in accordance with the present invention are demonstrated in a particularly marked manner if the rubber mixture contains about 10 to about 110 phr of gel out of 100 parts of the overall rubber mass.

A substance acting as the coupling agent may be A—R—A, wherein A is a nucleophilic group, and R is a saturated or unsaturated hydrocarbon group. A may preferably be —Si—OH, —OH, $-NH_2$, $-NHR^1$, $-NR^1_2$ with $R^1$ being an alkyl group with up to about 3 carbon atoms. Other substituents may also be used, provided that they are capable of carrying out a nucleophilic attack on the positive center of the gel. It is preferred that each nucleophilic group of the coupling agent be the same.

As noted, R of the coupling agent may be a hydrocarbon group. The hydrocarbon group may preferably be an aliphatic group having a molecular weight of up to about 10,000 g/mol, and more preferably up to about 5,000 g/mol. R of the coupling agent may be a siloxane group. A preferred siloxane is polydimethyl siloxane, preferably with a molecular weight of up to about 10,000 g/mol, and more preferably up to about 5,000 g/mol.

The quantity of added coupling agents depends on the number of electrophilic centers on the gel, so that approximately 25 to 100% of the number of these reactive groups of the gel enter into a chemical bond with the coupling agent. The rubber composition of the present invention may also contain different coupling agents mixed therein.

Preferably, the rubber composition of the present invention contains a substance acting as a coupling agent having the following structure:

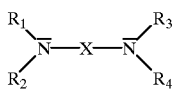

where each of $R_1$, $R_2$, $R_3$, and $R_4$ may be the same or different and may be —H or an alkyl group, which may be branched or unbranched and may have up to about 4 C atoms, and X may be an alkyl group, which is branched, unbranched or cyclic and may have up to about 12 C atoms.

For a substance acting as a coupling agent, 1,8-diamino octane and 1,4-bis-dimethyl aminobutane are particularly preferred.

With respect to 1,8-diamino octane, the chemical reaction with the gels is represented as follows:

−59° C., acrylonitrile content: 18%) made by the BF Goodrich Company, USA), and c) polydimethyl siloxane containing $NH_2$ groups, an example of which is AC 3309 with 0.33 mol $NH_2$/g made by Bayer AG, Leverkusen, Germany.

The coupling agents indicated in a) and b), above are particularly useftil due to their double bonding percentage. They are advantageously in a position to cure the remaining elastomer matrix during the vulcanization, which results in products with improved mechanical properties.

Furthermore, the rubber composition according to the present invention may contain conventional additives such as anti-aging agents, processing agents, and softeners. The anti-aging agents may be 6PPD, which is also known as N-phenyl-N'-(1,3-dimethylbutyl)-p-phenylenediamine or DTPD which is also known as N,N'-ditolyl-p-phenylenediamine. The processing agents may be stearic acid, waxes, fats, or dispersing agents. The softeners may be phthalic acid esters.

The rubber composition of the present invention may also contain other conventional fillers and in particular, conventional active fillers such as carbon black and silicic acid. The carbon blacks may have the following characteristics: DBP

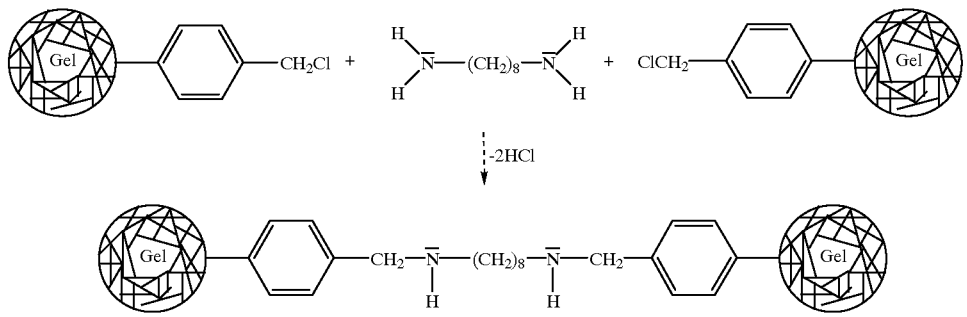

Other preferrable substances acting as coupling agents have the following structure:

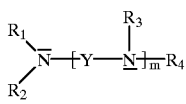

wherein each of $R_1$, $R_2$, $R_3$, and $R_4$ may be the same or different and may be H or an alkyl group which may be branched or unbranched and have up to about 4 C atoms, wherein Y may be an alkyl group which may be branched or unbranched and may have up to about 4 C atoms, and m may be an integer from 1 to 6.

Pentacthylene hexamine is a preferred representative of the foregoing class of substances acting as a coupling agent.

In addition, the following substances may be used as coupling agents in accordance with the present invention:

a) polybutadiene terminated with OH groups, an example of which is "Liquiflex" (fluid BE—molecular weight: approximately 2,000–3,000) made by Petroflex, Brazil), b) copolymer of butadiene and acrylonitrile, which is terminated with $NH_2$ groups and has a molecular weight of 3,000 to 4,500 g/mol and an acrylonitrile content of 5 to 30 weight percent, an example of which is ATBN 1300X42 "Hycar" (molecular weight: approximately 3,500–4,000 g,/mol, glass temperature:

count (ASTM-D 2414) about 90 to about 200 $cm^3$/100 g and CTAB count (ASTM-D 3765) of about 35 to about 220 $m^2$/g. The silicic acid may have a BET surface of about 145 to about 270 $m^2$/g (ASTM D 5604), a CTAB count of about 0120 to about 285 $m^2$/g (ASTM D 3765) and a pore volume of about 0.7 to about 1.7 ml/g (DIN 66133). For example, VN3 (Degussa AG, Germany) may be used as the silicic acid. Likewise, the rubber composition of the present invention may also contain inactive fillers, Such as chalk. In addition, the rubber composition of the present invention may also contain certain percentages of uncured gels or gels that do not have the corresponding characteristics which may result from the gel manufacturing process. The percentages, however, should be kept as low as possible so as not to negatively influence the properties of the vulcanizate.

Sulfur or a sulfur donor (e.g., DTDM-dimorpholyldisulfide) can be used for the vulcanization of the rubber composition. However, it is also possible to permit the vulcanization to occur with the aid of other vulcanizing agents, such as peroxides, resins, or radiation. In addition, vulcanization-influencing substances, such as accelerators or activators for the corresponding type of vulcanization, may be added to the rubber composition. For example, for sulfur vulcanization, the vulcanizing agent may be CBS, which is known as benzothiazyl-2-cyclohexylsulfenamide, TMTD, which is known as tetramethyltlituramdisulfide, or TBBS, which is known as benzothiazyl-2-tert.-butylsulfenamide.

The rubber component of the rubber composition according to the present invention may contain at least one polymer preferably selected from natural rubber, cis-polyisoprene with a cis-1,4-percentage>about 90 mol %, styrene-butadiene copolymer, polybutadiene or mixtures thereof.

The polyisoprene may be obtained by means of stereospecific polymerization in solution with Ziegler-Natta catalysts, such as $TiCl_4/Al(Alkyl)_3$ or through the use of finely distributed lithium alkylene, Such as n-butyl lithium. Preferred styrene-butadiene copolymers are those with contents of polymerized-in styrene of about 18 to about 60, preferably about 20 to about 50 wt. % solution or emulsion polymerizates.

Furthermore, polybutadiene is preferably used for the rubber composition according to the present invention. It is not significant which process has been used to produce the polybutadiene.

Furthermore, the rubber composition according to the present invention may contain one or several rubber components known from the prior art. These rubber components may include the following: butyl rubber (IIR), acrylonitrile-butadiene copolymer (NBR), hydrated acrylonitrile-butadiene copolymer (HNBR), ethylene-propylene copolymer (EPIM), ethylene-propylene-diene-terpolymer (EPDM).

The production of a rubber composition according to the present invention may be carried out in different ways. In a first mixing stage, it is possible to add the gel into the mixing unit in a master batch with one or several rubber components and if necessary, other conventional additives. In a second mixing stage, other fillers may be introduced into the basic mixture together with the coupling agent and other additives, if necessary. The sequence of adding the gel, the coupling agent and additives is not critical. Thus, it is possible to reverse the sequence of the addition of the gel, the filler, and the coupling agent. After the completion of the basic mixture, the basic mixture may be stored for later use or the vulcanization components may be added to the basic mixture, thus producing the finished mixture. After a blank is formed, it is subjected to vulcanization.

As stated above, the rubber composition according to the present invention may be used for producing rubber articles that are placed under stress. Besides tires, articles include, for example, reinforcement layers, pneumatic springs, conveyor belts, drive belts, and the like.

It is particularly preferable to use the rubber composition according to the present invention for producing components of vehicle tires. For example, such components include side-walls, reinforcing layers, and the like may be manufactured from the rubber composition. It is preferable to use the rubber composition according to the present invention for producing the tread of a vehicle tire, particularly pneumatic vehicle tires. In this regard, the tread may be constructed of one part or several parts, including the cap and the base constriction. Especially when the rubber composition is used for the tread portion, which comes into contact with the roadway, i.e., the cap of the tire, the rubber composition according to the present invention has an advantageous effect on the rolling resistance and the wet slippage behavior. Otherwise, the pneumatic vehicle tires have a conventional design with regard to structure and mixture composition.

EXAMPLES

The invention will be explained in detail in conjunction with the following exemplary embodiment:

Example 1

Gel A

Lipolan 4046 is a carboxylated SBR latex from Polymer Latex GmbH of Germany. It contains 40 percent styrene by weight, is carboxylated with 2 percent by weight acrylic acid, and has a solids content of 53 percent by weight. The gel content of the latex is 95.9 percent by weight. The swelling index of the gel portion is 7.7% (wet weight/dry weight in toluene). The latex particles have a diameter (ultracentrifuge) of $d_{10}=110$ nm, $d_{50}=192$ nm and $d_{80}=$about 212 nm. The density of the latex particles is 0.9744 g/cm$^3$. The glass temperature of the SBR is −33.5° C.

For subsequent cross-linking with dicumyl peroxide (DCP), the latex is diluted to a solids concentration of 30 percent by weight and placed in an autoclave. DCP is added in solid form at room temperature (1 phr relative to solid product). By heating the latex to 60° C., the DCP is melted and distributed well into the latex by stirring. To remove oxygen, the reactor contents are evacuated at 60° C. while stirring and pressurized with nitrogen. The evacuation/nitrogen pressurization cycle is repeated 3 times. Then the reactor is heated to 150° C. To avoid latex bake-on during heating, care is taken that the difference between the jacket temperature and interior temperature should not exceed 10° C. After heating, the internal temperature is maintained at a minimum of 150° C. for 45 minutes. Then the gel obtained is cooled and filtered through a Monodur filtration fabric.

As a result of the cross-linking with DCP, the glass temperature is caused to increase to −26.5° C. The particle size is essentially unaffected by the subsequent cross-linkage.

In order to ensure good distribution of the gels in the later rubber matrix, the gel latex is processed with NR into an NR master batch, according to which an NR/gel weight ratio of 50/50 is set.

Taytex, having a solids concentration of 61 percent by weight (importer: Theodor Durrieu, Hamburg, Germany), is used as the NR master batch component.

Before the gel is mixed with the NR latex, the latter is diluted by the addition of 5 percent by weight—relative to the weight of the NR latex—with a 5% Dresinate 731 solution, which is the sodium salt of disproportionated abietic acid made by the Hercules company, Wilmington, USA. Then, the NR latex is mixed with the gel for 10 minutes under intensive stirring at room temperature.

After manufacture of the NR latex/gel mixture, an anti-aging dispersion is added. For this purpose, a 10% aqueous solution of an aminic anti-aging agent is used. To stabilize 1 kg solid product, 50 g of a dispersion of Vulkanox (N-isopropyl-N-phenyl-p-phenylene-diamine, made by Bayer AG, Germany), 0.0913 g NaOH and 0.45 g emulsifier T 11 (partially hydrated stearic acid made by Proctor & Gamble, Cincinnati, USA) and 0.193 g Oulu GP 331 (unmodified resinic acid, made by Veitsiluto, Oulo, Finland) are used.

For coagulation, the stabilized NR latex/gel mixture is stirred into an electrolyte solution that has been heated to 60° C. The electrolyte solution contains 10 l water, 75 g common salt, 13.6 g hydrated aluminum sulfate, i.e., $Al_2(SO_4)_3 \cdot 18 H_2O$, 1.5 g gelatine and is used to coagulate 1 kg solid product (NR latex/gel mixture). During coagulation, the pH value is maintained at pH=4.0 with 10% sulfuric acid.

The product is filtered off and washed with approximately 40 l Lewatite water and dried at 70° C. in a vacuum shelf dryer. Gel A/NR master batch is thus obtained.

Example 2

Gel B

Gel B is produced from SBR latex Baystal 1357/4 from Polymer Latex GmbH, Germany (formerly Bayer France, Port Jérôme) by subsequent cross-linking with 1.5 phr dicumyl peroxide and by grafting with 5 phr chloromethyl styrene. The gel is isolated in pure form, i.e., without using the master batch technique.

Baystal 1357/4 is a noncarboxylated SBR latex with a styrene content of 22 percent by weight and a solids content of 38 percent by weight. The gel content of the latex is 75 percent by weight and the swelling index of the gelled portion is 61 (wet weight/dry weight in toluene). The latex particles have a diameter of $d_{10}$=50 nm, $d_{50}$=56 nm and $d_{80}$=60 nm. The density of the latex particles is 0.9281 g/cm$^3$. The glass temperature of the SBR is –57° C.

The particle size of the gel is essentially unaffected by the subsequent cross linkage with DCP; the gel content increases to 97.5 percent by weight and the density increases to 0.9717 g/cm$^3$; the swelling index decreases by 5.4% and the glass temperature increases to –26.5° C.

After cross-linking, the gel is grafted with 5 phr chloromethyl styrene. To this end, the gel is restabilized with the Na salt of an alkylsulfonate (Mersolat K 30 made by Bayer AG, Germany) (0.75% relative to gel solids) and diluted with water to a solids concentration of 22%. At room temperature, 5 phr chloromethyl styrene (Dow Chemical, Stade, Germany) relative to gel solids and 0.2% relative to gel solids of 50% p-menthane hydroperoxide (Triganox NT 50 made by Akzo Nobel, Arnheim, Netherlands) are added to a 13.4% (0.09% relative to gel solids) aqueous solution of the Na salt of t-hydroxymetlhane sulfinic acid dihydrate (Rongalit, BASF AG, Germany), and are heated to 70° C. while stirring. The internal temperature is maintained at 70° C. until a final solids content corresponding to a 100% polymerization reaction is achieved (approximately 1 hour). During the reaction, the pH of the reaction mixture is kept at 10 by adding drops of a 1 N aqueous solution of sodium hydroxide.

Prior to isolation of the gel, it is treated with a dispersion of phenolic anti-aging agent, where 1.3 g of the dispersion (0.65 percent by weight relative to latex solids) are used for 100 g latex solids. The stabilizer dispersion contains 10.8 parts by weight Lewatite water and 1.2 parts by weight NV 10 emulsifier (ethoxylated nonylphenol made by Bayer AG, Germany), 1 part by weight Vulkanox ZKF (2,2-methylene-bis-(4-methyl-6-cyclohexylphenol), made by Bayer AG, Germany), 4 parts by weight Vulkanox KB (2,6-di-t-butyl-4-methylphenol, made by Bayer AG, Germany), 7 parts by weight Iroaizox PS 800 (made by Ciba Geigy, Switzerland), and is produced through Ultraturrax dispersion of the anti-aging agent mixture in the aqueous NP 10 solution that has been heated to 95° C.

To isolate 100 g of gel B, the gel to which the anti-aging agent has been added is stirred into a precipitating bath that has been heated to 65° C. The bath comprises: 1245 g Lewatite water, 46.8 g common salt, and 25 g 1% precipitating agent (Superfloc C 567 Flocculant, Cytec Industries, USA). The pH is adjusted to 4 with 10% sulfuric acid. During coagulation, the bath is maintained at pH 4.0±0.5 by adding more 10% sulfuric acid. The coagulated product is washed twice for 30 minutes at 65° C., where the amount of water used each time is 5 times the amount of rubber. After drying, the gel B is obtained.

After grafting, the chlorine content, which is determined through elementary analysis, is 0.4 percent by weight. Grafting does not affect the level of the glass temperature.

Example 3
Gel C

Gel C is produced from SBR latex Baystal 1357 (made by Polymer Latex GmbH, Germany) by subsequent cross-linking with 1.5 phr dicumyl peroxide and subsequent grafting with 10 phr chloromethyl styrene. Prior to grafting, the colloid stability of the gel is improved by adding 1.5 percent by weight of Mersolat K 30 (made by Bayer AG, Germany). The activation of polymerization is carried out with 0.4 percent by weight of Triganox NT50 (made by Akzo Nobel, Arnheim, Netherlands) and 0.18 percent by weight of Rongalit (made by BASF, Germany). The polymer gel is stabilized and isolated from the latex in pure form, i.e., without using the master batch technique, as described for gel B.

After grafting, the gel C contains 1 percent by weight chlorine and has a gel content of 98 percent by weight, a swelling index of 3.8 and a glass temperature of –24° C.

Example 4
Gel D

Gel D is produced from an SBR latex with 39 percent by weight styrene (Bayer AG, Leverkusen, Germany), $d_{10}$=108 nm; $d_{50}$=125 nm; $d_{80}$=135 nm; gel content: 95.5 percent by weight; swelling index: 13.5; glass temperature: –34° C. through subsequent cross-linkage with 1.2 phr dicumyl peroxide and through grafting with 3 phr chloromethyl styrene. The pre-cross-linked and modified latex is stabilized as described for gel A, and can be processed as a 50% NO master batch.

In Table 1 below, a rubber mixture is produced in the conventional way, where the gel B is used as filler:

TABLE 1

| Components | Reference - Prior Art 1 | Reference [phr] 2 | Invention [phr] 3 | Invention [phr] 4 |
| --- | --- | --- | --- | --- |
| natural rubber | 100 | 100 | 100 | 100 |
| carbon black N121 | 50 | 20 | 20 | 20 |
| gel B | — | 50 | 50 | 50 |
| 1,4-dimethyl-aminobutane | — | — | — | 0.75 |
| 1,8-diamino octane | — | — | 0.75 | — |
| anti-aging agent 6 PPD | 1.5 | 1.5 | 1.5 | 1.5 |
| zinc oxide | 3 | 3 | 3 | 3 |
| stearic acid | 2 | 2 | 2 | 2 |
| sulfur | 1.65 | 1.65 | 1.65 | 1.65 |
| accelerator TBBS | 1 | 1 | 1 | 1 |

The unit phr relates to 100 parts of the overall weight of the rubber components. The rubber mixture is vulcanized for 30 minutes at 150° C.

TABLE 2

| Properties | Reference - Prior Art 1 | Reference 2 | Invention 3 | Invention 4 |
| --- | --- | --- | --- | --- |
| tensile strength [MPa] DIN 53504 | 24.6 | 19.7 | 21.3 | 20.7 |
| elongation at break [%] DIN 53504 | 550 | 490 | 420 | 460 |
| tensile modulus 100% [MPa] DIN 53504 | 1.98 | 2.19 | 2.78 | 2.42 |
| tensile modulus 300% [MPa] DIN 53504 | 11.77 | 9.85 | 13.98 | 11.82 |
| hardness [Shore A] | 60 | 63 | 66 | 65 |

TABLE 2-continued

| Properties | Reference - Prior Art 1 | Reference 2 | Invention 3 | Invention 4 |
|---|---|---|---|---|
| DIN 53505 rebound resilience [%] 23° C. DIN 53512 | 46 | 37 | 39 | 37 |
| rebound resilience [%] 70° C. DIN 53512 | 57 | 62 | 62 | 61 |

It can be seen from Table 2 that conventional compounds without gels (reference 1) do in fact have a favorable mechanical durability, but they are insufficiently suitable for use in tire treads due to a poor wet slippage behavior, i.e., higher rebound resilience values at 23° C. and a high rolling resistance, i.e., lower rebound resilience values at 70° C. If only modified gels are mixed in, e.g., gels, whose surfaces have electrophilic centers (reference 2), the rolling resistance and the wet slippage behavior are in fact improved, but the mechanical durability of the vulcanizate decreases.

If modified gels are added to the compound in combination with a corresponding coupling agent (invention 3 and 4), the tensile strength and tensile modulus of the vulcanizate are increased. The tensile modulus provides information about the rigidity of the vulcanized product. If these rubber compositions (inventions 3 and 4) are used to produce tire treads for vehicle tires, this signifies an increased rigidity, e.g., of the profiled block edges, which results in better traction. It can be seen from the values of the rebound resilience that the compositions 3 and 4 according to the present invention demonstrate a better wet slippage behavior in comparison to reference 1, while at the same time demonstrating a reduced rolling resistance. Therefore, in particular, pneumatic vehicle tires may be produced which have increased tensile modulii while having optimal damping properties, where the driving comfort, the traction, and the service life of the tire are improved as a result.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A composition comprising a rubber mixture that can be vulcanized with a vulcanizing agent, which comprises:
 a) at least one rubber component,
 b) at least one filler,
 c) as an additional filler, gel particles comprising a rubber, having a particle size between about $3\times10^{-9}$ and about $1\times10^{-6}$ m and a swelling index in toluene of about 1 to about 15 and whose surface has electrophilic centers,
 d) a substance acting as a coupling agent between the gel particles of the additional filler and having the following structure:

wherein A is a nucleophilic group,
 R is a saturated or unsaturated hydrocarbon group having a molecular weight of up to about $10^6$ g/mol or siloxane group having a molecular weight of up to about $10^6$ g/mol.

2. The composition according to claim 1 wherein A is selected from one of —$NH_2$, —SH, —Si—OH, —OH, —$NR^1_2$ or —$NHR^1$, wherein $R^1$ may be an alkyl group with up to about 3 carbon atoms or a phenyl group.

3. The composition according to claim 1 wherein the gel is butadiene-styrene rubber modified with p-chloromethyl styrene with a swelling index in toluene between about 1 and about 15 and a particle size between about $3\times10^{-9}$ and about $1\times10^{-6}$ m.

4. The composition according to claim 1 wherein the composition comprises about 10 to about 110 phr gel relative to 100 parts of the rubber component.

5. The composition according to claim 1 wherein the substance acting as a coupling agent has the following structure:

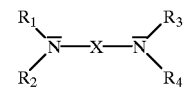

wherein each of $R_1$, $R_2$, $R_3$, and $R_4$ can be the same or different and is H or a branched or unbranched alkyl group having up to about 4 C atoms; and X is a branched, unbranched or cyclic alkyl group having up to about 12 C atoms.

6. The composition according to claim 5 wherein the substance acting as a coupling agent is 1,8-diamino octane.

7. The composition according to claim 5 wherein the substance acting as a coupling agent is 1,4-bis-dimethylaminobutane.

8. The composition according to claim 1 wherein the substance acting as a coupling agent has the following structure:

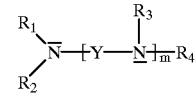

wherein each of $R_1$, $R_2$, $R_3$, and $R_4$ can be the same or different and is H or a branched or unbranched alkyl group having up to about 4 C atoms; Y is a branched, unbranched or cyclic alkyl group having up to about 4 C atoms; and m is an integer from 1 to 6.

9. The composition according to claim 8 wherein the substance acting as a coupling agent is pentaethylene hexamine.

10. The composition according to claim 1 wherein the substance acting as a coupling agent is polybutadiene terminated with OH-groups.

11. The composition according to claim 1 wherein the substance acting as a coupling agent is a copolymer of butadiene and acrylonitrile terminated with $NH_2$ groups.

12. The composition according to claim 11 wherein the copolymer has a molecular weight of about 3,000 to about 4,500 g/mol and has an acrylonitrile content of about 5 to about 30 weight percent.

13. The composition according to claim 1 wherein the substance acting as a coupling agent is polydimethyl siloxane that contains NH$_2$ groups.

14. The composition according to claim 1 wherein the rubber component is selected from natural, synthetic polyisoprene, styrene-butadiene copolymer, polybutadiene or mixtures thereof.

15. The composition according to claim 1 wherein, based on 100 parts by weight of the rubber component, the gel particles having electrophilic centers are present in a range of from about 10 phr to about 110 phr, and the substance acting as a coupling agent is present in a range of from about 10 mole % to about 100 mole % with respect to the molar amount of the electrophilic centers of the gel particles.

16. The composition according to claim 15 wherein, based on 100 parts by weight of the rubber component, the gel particles having electrophilic centers are present in a range of from about 25 phr to about 85 phr, and the substance acting as a coupling agent is present in a range of from about 10 mole % to about 50 mole % with respect to the molar amount of the electroplilic centers of the gel particles.

17. The composition according to claim 16 wherein, based on 100 parts by weight of the rubber component, the gel particles having electrophilic centers are present in a range of from about 40 phr to about 60 phr, and the substance acting as a coupling agent is present in a range of from about 15 mole % to about 35 mole % with respect to the molar amount of the electroplilic centers of the gel particles.

18. A method of formulating a composition, which comprises:

forming a mixture comprising at least one rubber component and mixing; adding to the mixture at least one filler and mixing; adding to the mixture as an additional filler, gel particles comprising a rubber, having a particle size between about $3 \times 10^{-9}$ and about $1 \times 10^{-6}$ m and a swelling index in toluene of about 1 to about 15 and whose surface has electrophilic centers, and mixing; and adding to the mixture a substance acting as a coupling agent between the gel particles of the additional filler and having one of the following structures:

wherein A is a nucleophilic group, and R is a saturated or unsaturated hydrocarbon group having a molecular weight of up to about $10^6$ g/mol or siloxane group having a molecular weight of up to about $10^6$ g/mol.

19. The method of formulating according to claim 18 wherein A is selected from one of —NH$_2$, —SH, —Si—OH, —OH, —NR$^1_2$ or —NHR$^1$, wherein R$^1$ may be an alkyl group with up to about 3 carbon atoms or a phenyl group.

20. The method of formulating according to claim 18 wherein the gel is butadiene-styrene rubber modified with p-chloromethyl styrene with a swelling index in toluene between about 1 and about 15 and a particle size between about $3 \times 10^{-9}$ and about $1 \times 10^{-6}$ m.

21. The method of formulating according to claim 18 wherein the composition comprises about 10 to about 110 phr gel relative to 100 parts of the rubber component.

22. The method of formulating according to claim 18 wherein the substance acting as a coupling agent has the following structure:

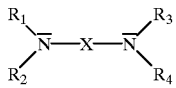

wherein each of R$_1$, R$_2$, R$_3$, and R$_4$ can be the same or different and is H or a branched or unbranched alkyl group having up to about 4 C atoms; and X is a branched, unbranched or cyclic alkyl group having up to about 12 C atoms.

23. The method of formulating according to claim 22 wherein the substance acting as a coupling agent is 1,8-diamino octane.

24. The method of formulating according to claim 22 wherein the substance acting as a coupling agent is 1,4-bis-dimethylaminobutane.

25. The method of formulating according to claim 18 wherein the substance acting as a coupling agent has the following structure:

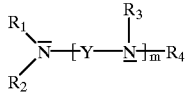

wherein each of R$_1$, R$_2$, R$_3$, and R$_4$ can be the same or different and is H or a branched or unbranched alkyl group having up to about 4 C atoms; Y is a branched, unbranched or cyclic alkyl group having up to about 4 C atoms; and m is an integer from 1 to 6.

26. The method of formulating according to claim 25 wherein the substance acting as a coupling agent is pentaethylene hexamine.

27. The method of formulating according to claim 18 wherein the substance acting as a coupling agent is polybutadiene terminated with OH-groups.

28. The method of formulating according to claim 18 wherein the substance acting as a coupling agent is a copolymer of butadiene and acrylonitrile terminated with NH$_2$ groups.

29. The method of formulating according to claim 28 wherein the copolymer has a molecular weight of about 3,000 to about 4,500 g/mol and has an acrylonitrile content of about 5 to about 30 weight percent.

30. The method of formulating according to claim 18 wherein the substance acting as a coupling agent is polydimethyl siloxane that contains NH$_2$ groups.

31. The method of formulating according to claim 18 wherein the rubber component is selected from natural, synthetic polyisoprene, styrene-butadiene copolymer, polybutadiene or mixtures thereof.

32. The method of formulating according to claim 18 wherein, based on 100 parts by weight of the rubber component, the gel particles having electrophilic centers are present in a range of from about 10 phr to about 110 phr, and the substance acting as a coupling agent is present in a range of from about 10 mole % to about 100 mole % with respect to the molar amount of the electrophilic centers of the gel particles.

33. The method of formulating according to claim 28 wherein, based on 100 parts by weight of the rubber component, the gel particles having electrophilic centers are present in a range of from about 25 phr to about 85 phr, and the substance acting as a coupling agent is present in a range of from about 10 mole % to about 50 mole % with respect to the molar amount of the electrophilic centers of the gel particles.

34. The method of formulating according to claim 29 wherein, based on 100 parts by weight of the rubber component, the gel particles having electrophilic centers are present in a range of from about 40 phr to about 60 phr, and the substance acting as a coupling agent is present in a range of from about 15 mole % to about 35 mole % with respect to the molar amount of the electrophilic centers of the gel particles.

35. The method of formulating a composition according to claim 18 further comprising adding a vulcanization agent to the base mixture, forming a blank to be vulcanized and vulcanizing the blank, thereby resulting in an article.

36. A composition comprising a rubber mixture that can be vulcanized with a vulcanizing agent which comprises:
   a) at least one rubber component,
   b) at least one filler,
   c) as an additional filler, gel particles consisting essentially of a rubber, having a particle size between about $3 \times 10^{-9}$ and about $1 \times 10^{-6}$ m and a swelling index in toluene of about 1 to about 15 and whose surface has electrophilic centers,
   d) a substance acting as a coupling agent between the gel particles of the additional filler and having the following structure:

A—R—A wherein A is a nucleophilic group, and is selected from —$NH_2$, —SH, —Si—OH, —OH, or —$NHR^1$ wherein $R^1$ is an alkyl group having up to about 3 carbon atoms or a phenyl group; and
   R is a saturated or unsaturated hydrocarbon group having a molecular weight of up to about $10^6$ g/mol or siloxane group having a molecular weight of up to about $10^6$ g/mol.

37. The composition according to claim 36 wherein the gel is butadiene-styrene rubber modified with p-chloromethyl styrene with a swelling index in toluene between about 1 and about 15 and a particle size between about $3 \times 10^{-9}$ and about $1 \times 10^{-6}$ m.

38. The composition according to claim 36 wherein the composition comprises about 10 to about 110 phr gel relative to 100 parts of the rubber component.

39. The composition according to claim 36 wherein the substance acting as a coupling agent has the following structure:

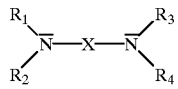

wherein each of $R_1$, $R_2$, $R_3$, and $R_4$ can be the same or different and is H or a branched or unbranched alkyl group having up to about 4 C atoms; and X is a branched, unbranched or cyclic alkyl group having up to about 12 C atoms.

40. The composition according to claim 39 wherein the substance acting as a coupling agent is 1,8-diamino octane.

41. The composition according to claim 39 wherein the substance acting as a coupling agent is 1,4-bis-dimethylaminobutane.

42. The composition according to claim 36 wherein the substance acting as a coupling agent has the following structure:

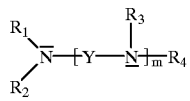

wherein each of $R_1$, $R_2$, $R_3$, and $R_4$ can be the same or different and is H or a branched or unbranched alkyl group having up to about 4 C atoms; Y is a branched, unbranched or cyclic alkyl group having up to about 4 C atoms; and m is an integer from 1 to 6.

43. The composition according to claim 42 wherein the substance acting as a coupling agent is pentaethylene hexamine.

44. The composition according to claim 36 wherein the substance acting as a coupling agent is polybutadiene terminated with OH-groups.

45. The composition according to claim 36 wherein the substance acting as a coupling agent is a copolymer of butadiene and acrylonitrile terminated with $NH_2$ groups.

46. The composition according to claim 45 wherein the copolymer has a molecular weight of about 3,000 to about 4,500 g/mol and has an acrylonitrile content of about 5 to about 30 weight percent.

47. The composition according to claim 36 wherein the substance acting as a coupling agent is polydimethyl siloxane that contains $NH_2$ groups.

48. The composition according to claim 36 wherein the rubber component is selected from natural, synthetic polyisoprene, styrene-butadiene copolymer, polybutadiene or mixtures thereof.

49. The composition according to claim 1 wherein the rubber component is selected from natural, synthetic polyisoprene, styrene-butadiene, polybutadiene or mixtures thereof, the gel particles are present in the range of from about 10 phr to about 110 phr, and the substance acting as a coupling agent is present in the range of from about 10 mole % to about 100 mole % with respect to the molar amount of the electrophilic centers of the gel particles, and has the structure A—R—A, wherein A is selected from one of —$NH_2$, —SH, —Si—OH, —OH, —$NR^1_2$ or —$NHR^1$, wherein $R^1$ may be an alkyl group with up to about 3 carbon atoms or a phenyl group, and R is a saturated or unsaturated hydrocarbon group having a molecular weight of up to about $10^6$ g/mol or siloxane group having a molecular weight of up to about $10^6$ g/mol.

50. The method of formulating according to claim 18 wherein the rubber component is selected from natural, synthetic polyisoprene, styrene-butadiene, polybutadiene or mixtures thereof, the gel particles are present in the range of from about 10 phr to about 110 phr, and the substance acting as a coupling agent is present in the range of from about 10 mole % to about 100 mole % with respect to the molar amount of the electrophilic centers of the gel particles, and has the structure A—R—A, wherein A is selected from one of —$NH_2$, —SH, —Si—OH, —OH, —$NR^1_2$, or —$NHR^1$, wherein $R^1$ may be an alkyl group with up to about 3 carbon atoms or a phenyl group, and R is a saturated or unsaturated hydrocarbon group having a molecular weight of up to about $10^6$ g/mol or siloxane group having a molecular weight of up to about $10^6$ g/mol.

* * * * *